(12) United States Patent
Wu

(10) Patent No.: US 9,223,175 B2
(45) Date of Patent: Dec. 29, 2015

(54) APPARATUS FOR ALIGNING A TO-BE-ALIGNED DISPLAY PANEL BY SELF-ALIGNMENT EXPOSURE AND METHOD FOR FABRICATING RETARDATION PLATE

(71) Applicant: BOE Technology Group Co., Ltd., Beijing (CN)

(72) Inventor: Yanbing Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/355,571

(22) PCT Filed: Dec. 6, 2013

(86) PCT No.: PCT/CN2013/088756
§ 371 (c)(1),
(2) Date: Apr. 30, 2014

(87) PCT Pub. No.: WO2015/021709
PCT Pub. Date: Feb. 19, 2015

(65) Prior Publication Data
US 2015/0226993 A1 Aug. 13, 2015

(30) Foreign Application Priority Data

Aug. 15, 2013 (CN) .......................... 2013 1 0356415

(51) Int. Cl.
*F21V 21/14* (2006.01)
*G02F 1/13363* (2006.01)
(Continued)

(52) U.S. Cl.
CPC .......... *G02F 1/13363* (2013.01); *G02F 1/1303* (2013.01); *G02F 1/1337* (2013.01);
(Continued)

(58) Field of Classification Search
CPC .............. G02F 1/13363; G02F 1/1303; G02F 1/133528; G02F 1/1337
USPC ............. 445/425; 438/26–29, 34, 82; 427/66, 427/532–533, 539
See application file for complete search history.

(56) References Cited

U.S. PATENT DOCUMENTS

2011/0080566 A1 4/2011 Lin

FOREIGN PATENT DOCUMENTS

| CN | 101690247 A | 3/2010 |
| CN | 102213785 A | 10/2011 |
| CN | 102272658 A | 12/2011 |
| CN | 102590919 A | 7/2012 |
| CN | 102654595 A | 9/2012 |

(Continued)

OTHER PUBLICATIONS

PCT Notification of Transmittal of the International Search Report and the Written Opinion of the International Searching Authority, or the Declaration, for corresponding PCT Application No. PCT/CN2013/088756, 13 pages, (May 21, 2014).

*Primary Examiner* — Tracie Y Green
(74) *Attorney, Agent, or Firm* — Blakely, Sokoloff, Taylor & Zafman LLP

(57) ABSTRACT

An apparatus is disclosed for aligning a to-be-aligned display panel by self-alignment exposure, a first and second groups of pixels are distributed at intervals on the to-be-aligned display panel which includes a first and second substrates, a first polarizer is provided on the first substrate, and a light alignment layer is provided on the first polarizer, wherein the apparatus includes a base platform for placing the to-be-aligned display panel; a display panel driving system connected to the to-be-aligned display panel; light irradiating toward the first substrate from the second substrate is linearly polarized light; a first exposure light source located to be closer to the second substrate; a second exposure light source located to be closer to the first substrate, light emitted from the second exposure light source is linearly polarized light, the polarization direction of which is orthogonal to the transmission axis direction of the first polarizer.

18 Claims, 2 Drawing Sheets

(51) Int. Cl.
*G02F 1/13* (2006.01)
*G02F 1/1335* (2006.01)
*G02F 1/1337* (2006.01)
*G02F 1/1339* (2006.01)
*G02F 1/1341* (2006.01)
*G02F 1/1333* (2006.01)

(52) U.S. Cl.
CPC ............ *G02F1/1339* (2013.01); *G02F 1/1341* (2013.01); *G02F 1/133528* (2013.01); *G02F 2001/133354* (2013.01); *G02F 2001/133638* (2013.01)

(56) References Cited

FOREIGN PATENT DOCUMENTS

| | | | |
|---|---|---|---|
| CN | 102662247 A | 9/2012 | |
| CN | 103033988 A | 4/2013 | |
| CN | 203365918 U | 12/2013 | |
| CN | 103488057 B | 9/2014 | |
| JP | 2012-18256 A | 1/2012 | |
| TW | 201326989 A1 | 7/2013 | |
| WO | WO 02080579 | * 10/2002 | ............. H04N 13/00 |

* cited by examiner

APPARATUS FOR ALIGNING A TO-BE-ALIGNED DISPLAY PANEL BY SELF-ALIGNMENT EXPOSURE AND METHOD FOR FABRICATING RETARDATION PLATE

CROSS-REFERENCE TO RELATED APPLICATIONS

The present application is a U.S. National Stage under 35 U.S.C. §371 of International Application No. PCT/CN2013/088756, filed on Dec. 6, 2013, entitled APPARATUS FOR ALIGNING A TO-BE-ALIGNED DISPLAY PANEL BY SELF-ALIGNMENT EXPOSURE AND METHOD FOR FABRICATING RETARDATION PLATE, designating the United States, and claiming priority to Chinese Patent Application No. 201310356415.8, filed with the State Intellectual Property Office of the PRC on Aug. 15, 2013 and entitled "Apparatus for aligning a to-be-aligned display panel by self-alignment exposure and method for fabricating retardation plate."

FIELD OF THE INVENTION

The present invention relates to the field of display technology, and particularly to an apparatus for aligning a to-be-aligned display panel by self-alignment exposure and a method for fabricating a retardation plate.

BACKGROUND OF THE INVENTION

With the continuous development of display technology, stereoscopic display has become a major trend in the display technology. The fundamental principle of stereoscopic display is in that parallax images result in stereoscopic display, that is, the image for left eye is seen by the left eye of a viewer and the image for right eye is seen by the right eye of the viewer. The image for left eye and the image for right eye are a pair of stereoscopic images with parallax.

A way to achieve stereoscopic display is serial type, i.e., at a first time, the image for left eye is displayed on the display, and then only the left eye of the viewer can see the displayed image; and at a second time, the image for right eye is displayed on the display, and then only the right eye of the viewer can see the displayed image. Due to the persistence of vision on the human eye retina, people will feel that both the left eye and the right eye see the image for left eye and the image for right eye respectively and simultaneously to produce stereoscopic perception.

Another way to achieve stereoscopic display is parallel type, i.e., at the same time, the image for left eye is displayed by a portion of pixels on the display and the image for right eye is displayed by another portion of pixels on the display, and by means of grating, polarized glasses, etc., the display of the portion of pixels can be seen only by the right eye, and the display of another portion of pixels can be seen only by the left eye, thereby producing stereoscopic perception.

In order to present a better stereoscopic visual effect, currently it is usual to use polarized glasses to achieve stereoscopic display. The basic mechanism of the display technology is to arrange a device in front of the display panel to adjust the polarization direction of the outgoing light. Such a device may be a retardation plate, a liquid crystal cell, or other devices which can adjust the polarization direction of light emitted from pixels to be different.

The display principle that the retardation plate achieves stereoscopic display is shown in FIG. 1. On the display panel 7', when a row of pixels display the image for right eye, an adjacent row of pixels display the image for left eye; there exists a retardation plate 5' arranged in front of the display panel 7', and when one row achieves a $\lambda/2$ delay, an adjacent row achieves zero delay, so that on the output image 6', the polarization direction of light emitted from pixels undergoing the $\lambda/2$ delay rotates 90°. Thus, when wearing polarized glasses in which polarization directions of right and left eyes orthogonal to each other, the right eye only sees light emitted from pixels displaying the image for right eye, and the left eye only sees light emitted from pixels displaying the image for left eye, resulting in stereoscopic visual effect.

Among a variety of technologies using polarized glasses to achieve stereoscopic display, a retardation plate (pattern retarder) technology is most favored. Its basic mechanism is as follows: a retardation plate is accurately aligned on a display panel, and the retardation plate is attached on the display panel; on the retardation plate, different regions can achieve different phase delays, so that light from different pixels output in different polarization directions and a viewer wearing polarized glasses can see the 3D effect.

As shown in FIG. 2, a method for fabricating a retardation plate in the prior art is as follows:

(1) applying optical alignment material 2' on the substrate 1';

(2) placing a mask plate 3' above the optical alignment material 2';

(3) through the mask plate 3', irradiating a part of the optical alignment material 2' not blocked by the mask plate 3' by polarized light 4' to cure by exposure;

(4) removing the mask plate 3' and curing the remainder of the optical alignment material 2' by exposure;

(5) applying reacting material to perform alignment curing.

In the actual fabricating process of the retardation plate, it is required to use the mask plate, resulting in high fabrication cost, and the alignment accuracy is not high.

SUMMARY OF THE INVENTION (1) Technical Problems to be Solved

In order to solve the above technical problems, the present invention provides an apparatus for aligning a to-be-aligned display panel by self-alignment exposure and a method for fabricating a retardation plate so as to overcome defects that fabrication cost is high and the alignment accuracy is not high due to the fact that a mask plate is used to fabricate the retardation plate in the prior art.

(2) Technical Solutions

To solve the above technical problems, the present invention provides an apparatus for aligning a to-be-aligned display panel by self-alignment exposure, wherein a first group of pixels and a second group of pixels are distributed at intervals on the to-be-aligned display panel; the to-be-aligned display panel includes a first substrate and a second substrate, a first polarizer is provided on the first substrate, and a light alignment layer is provided on the first polarizer, the apparatus includes:

a base platform, for placing the to-be-aligned display panel, an area of the base platform corresponding to a display area of the to-be-aligned display panel is transparent;

a display panel driving system connected to the to-be-aligned display panel; under the control of the display panel driving system, areas of the to-be-aligned display panel corresponding to the first group of pixels are in a light-transmissive state, and areas of the to-be-aligned display panel corresponding to the second group of pixels are in a light-shading state;

a first exposure light source located to be closer to the second substrate, light irradiating towards the first substrate from the second substrate is linearly polarized light;

a second exposure light source located to be closer to the first substrate, light emitted from the second exposure light source is linearly polarized light, the polarization direction of which is orthogonal to the transmission axis direction of the first polarizer.

Preferably, an implementation wherein light irradiating towards the first substrate from the second substrate is linearly polarized light includes:

when a second polarizer is provided on the second substrate, light emitted from the first exposure light source is natural light, which irradiates towards the first substrate through the second polarizer.

Preferably, an implementation wherein light irradiating towards the first substrate from the second substrate is linearly polarized light includes:

when a second polarizer is provided on the second substrate, light emitted from the first exposure light source is linearly polarized light, the polarization direction of which is parallel to the transmission axis direction of the second polarizer;

alternatively, when there is no second polarizer provided on the second substrate, light emitted from the first exposure light source is linearly polarized light.

Preferably, an implementation wherein light irradiating towards the first substrate from the second substrate is linearly polarized light includes:

a quartz plate is provided on the base platform, light emitted from the first exposure light source is natural light, which irradiates towards the first substrate through the quartz plate.

Preferably, the apparatus further includes a first light source controlling system which is provided with an arc-shaped guide rail for controlling the first exposure light source to move along the arc-shaped guide rail so as to perform exposure on the to-be-aligned display panel.

Preferably, the center of the arc-shaped guide rail is located at best viewing point at the light-outgoing side of the to-be-aligned display panel.

Preferably, the apparatus further includes a second light source controlling system for controlling the second exposure light source to move horizontally within the plane parallel to the to-be-aligned display panel so as to perform exposure on the to-be-aligned display panel.

In another aspect, the present invention also provides a method for fabricating a retardation plate using the apparatus for aligning a to-be-aligned display panel by self-alignment exposure, including:

placing the to-be-aligned display panel on a base platform, connecting the to-be-aligned display panel to a display panel driving system, and controlling areas of the to-be-aligned display panel corresponding to a first group of pixels to be in a light-transmissive state and controlling areas of the to-be-aligned display panel corresponding to a second group of pixels to be in a light-shading state;

turning on the first exposure light source so that light emitted from the first exposure light source transmits through the base platform and the first group of pixels to align optical alignment material on an optical alignment layer corresponding to the first group of pixels by exposure;

aligning all optical alignment material on the optical alignment layer corresponding to the first group of pixels by exposure of the first exposure light source under the control of a first light source controlling system;

turning off the first exposure light source, and turning on the second exposure light source to align optical alignment material on the light alignment layer corresponding to the second group of pixels by exposure;

aligning all optical alignment material on the optical alignment layer corresponding to the second group of pixels by exposure of the second exposure light source under the control of a second light source controlling system; and after completing the process of alignment, injecting liquid crystal molecules, aligning the first substrate and the second substrate to be a cell, and performing a curing process on the liquid crystal cell.

(3) Advantageous Effects

The present invention provides an apparatus for aligning a to-be-aligned display panel by self-alignment exposure and a method for fabricating a retardation plate, thereby a retardation plate may be fabricated without using the mask plate, thus the production cost is reduced largely and the alignment accuracy is improved.

DETAILED DESCRIPTION OF THE EMBODIMENTS

The present invention will be further described below in detailed with reference to the drawings and embodiments. The following embodiments are for the purpose of explaining the present invention, but not intended to limit the scope of the present invention.

Figure 1:
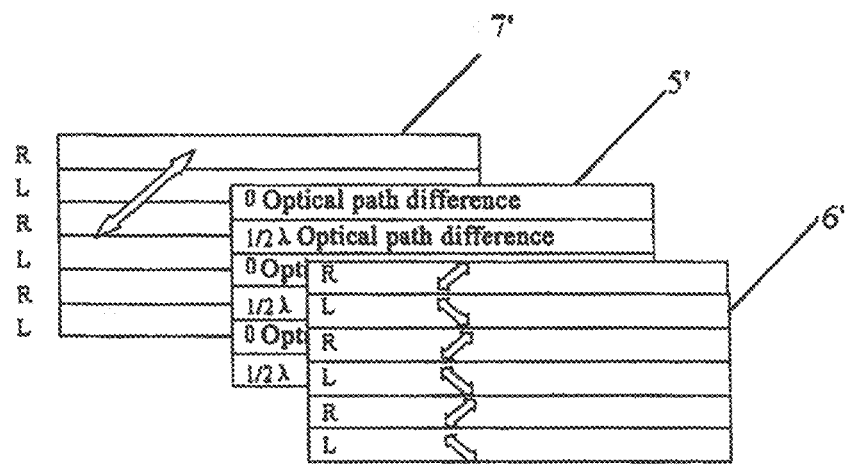
FIG. 1 is a schematic view showing principle of achieving stereoscopic display using a retardation plate in the prior art.
Figure 2:
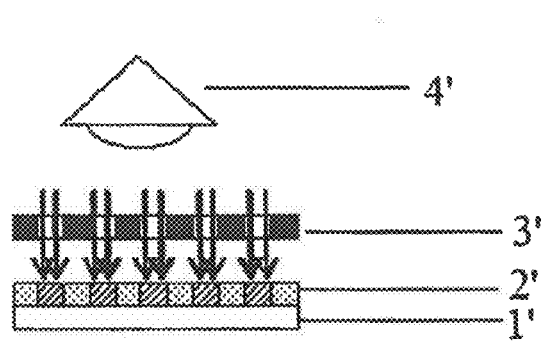
FIG. 2 is a schematic view illustrating a method for fabricating a retardation plate in the prior art.
Figure 3:
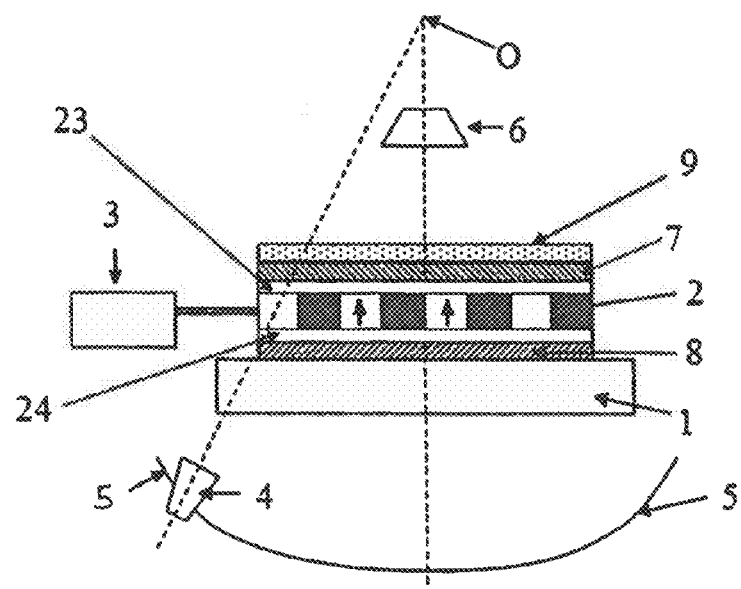
FIG. 3 is schematic view showing a structure of an apparatus for aligning a to-be-aligned display panel by self-alignment exposure according to an embodiment of the present invention.
Figure 4:
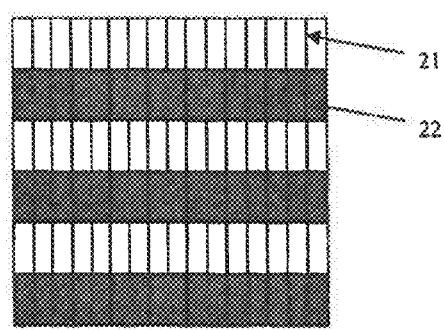
FIG. 4 is a schematic view showing an arrangement of pixels on a display panel according to an embodiment of the present invention.

As shown in FIGS. 3 and 4, an apparatus for aligning a to-be-aligned display panel by self-alignment exposure provided by the present invention mainly includes a base platform 1, a display panel driving system 3, a first exposure light source 4 and a second exposure light source 6.

The base platform 1 is used to place the to-be-aligned display panel 2 thereon and areas of the base platform 1 corresponding to display areas of the to-be-aligned display panel 2 are transparent.

The display panel driving system 3 is connected to the to-be-aligned display panel 2, wherein a first group of pixels 21 and a second group of pixels 22 are distributed at intervals on the to-be-aligned display panel; under the control of the display panel driving system 3, areas of the to-be-aligned display panel 2 corresponding to the first group of pixels 21 are in a light-transmissive state, and areas of the to-be-aligned display panel 2 corresponding to the second group of pixels 22 are in a light-shading state; wherein the first group of pixels 21 and the second group of pixels 22 may be distributed at intervals in rows, in columns, or in arrays. For example, as shown in FIG. 4, the first group of pixels 21 and the second group of pixels 22 are distributed at intervals in rows.

The to-be-aligned display panel 2 includes a first substrate 23 and a second substrate 24, a first polarizer 7 is provided on the first substrate 23, a light alignment layer 9 is provided on the first polarizer 7, and light irradiating towards the first substrate 23 from the second substrate 24 (the arrow direction in the display panel 2 is the light-outgoing direction) is linearly polarized light.

The first exposure light source 4 is located to be closer to the second substrate 24.

The second exposure light source 6 is located to be closer to the first substrate 23, light emitted from the second exposure light source 6 is linearly polarized light, and the polarization direction of the linearly polarized light is orthogonal to the transmission axis direction of the first polarizer 7.

Implementations wherein light irradiating towards the first substrate 23 from the second substrate 24 is linearly polarized light include:

light emitted from the first exposure light source 4 is natural light, a second polarizer 8 is provided on the second substrate 24, and the natural light irradiates towards the first substrate 23 through the second polarizer 8.

Alternatively, light emitted from the first exposure light source 4 is linearly polarized light, a second polarizer 8 is provided on the second substrate 24, and the polarization direction of the linearly polarized light is parallel to the transmission axis direction of the second polarizer 8; or when light emitted from the first exposure light source 4 is linearly polarized light, there is no second polarizer 8 provided on the second substrate 24.

Alternatively, a quartz plate is provided on the base platform 1, light emitted from the first exposure light source 4 is natural light, and the natural light becomes linearly polarized light after passing through the quartz plate, and the linearly polarized light irradiates towards the first substrate 23.

All above implementations can ensure that light irradiating towards the first substrate 23 from the second substrate 24 is linearly polarized light.

In addition, the apparatus for aligning a to-be-aligned display panel by self-alignment exposure further includes a first light source controlling system and a second light source controlling system, the first light source controlling system is provided with an arc-shaped guide rail 5 for controlling the first exposure light source 4 to move along the arc-shaped guide rail 5 so as to perform exposure on the to-be-aligned display panel 2. The center of the arc-shaped guide rail 5 is located at best viewing point at the light-outgoing side of the to-be-aligned display panel 2.

The second light source controlling system controls the second exposure light source 6 to move horizontally within a plane parallel to the to-be-aligned display panel 2 so as to perform exposure on the to-be-aligned display panel 2, ensuring uniform exposure for all the areas thereof.

It should be noted that, the display panel in the embodiment may be of TN mode, ADS mode, IPS mode or any other display mode.

The method for fabricating a retardation plate using the apparatus for aligning a to-be-aligned display panel by self-alignment exposure of the present invention will be described below in detail, the method includes:

placing the to-be-aligned display panel 2 on a base platform 1, connecting the to-be-aligned display panel 2 to a display panel driving system 3, and controlling areas of the to-be-aligned display panel 2 corresponding to a first group of pixels 21 to be in a light-transmissive state and controlling areas of the to-be-aligned display panel 2 corresponding to a second group of pixels 22 to be in a light-shading state;

turning on the first exposure light source 4 so that light emitted from the first exposure light source 4 transmits through the base platform 1 and the light transmitted through the base platform 1 which irradiates towards the first substrate 23 is linearly polarized light, the linearly polarized light transmits through areas of the to-be-aligned display panel 2 corresponding to the first group of pixels 21 to align optical alignment material on an optical alignment layer 9 corresponding to the first group of pixels 21 by exposure;

aligning a part of the optical alignment layer 9 corresponding to the first group of pixels 21 of the to-be-aligned display panel 2 by exposure of the first exposure light source 4 under the control of a first light source controlling system;

turning off the first exposure light source 4, and turning on the second exposure light source 6 to align a part of the light alignment layer 9 corresponding to the second group of pixels 22 by exposure; and after completing the process of alignment, injecting liquid crystal molecules, aligning the first substrate and the second substrate to be a cell, and performing a curing process on the liquid crystal cell. Thus, the fabrication of the retardation plate is finished.

The method for fabricating a retardation plate provided by the present invention avoids a mask plate being used to fabricate the retardation plate, reducing production cost largely and improving the alignment accuracy.

The foregoing embodiments are only the preferred embodiments of the present invention, and it should be pointed out that various modifications and variations can be made by a person of ordinary skilled in the art without departing from the spirit of the present invention. These modifications and variations should be considered to be within protection scope of the present invention.

What is claimed is:

1. An apparatus for aligning a to-be-aligned display panel by self-alignment exposure, wherein a first group of pixels and a second group of pixels are distributed at intervals on the to-be-aligned display panel; the to-be-aligned display panel includes a first substrate and a second substrate, a first polarizer is provided on the first substrate, and a light alignment layer is provided on the first polarizer, the apparatus including:

a base platform, for placing the to-be-aligned display panel, an area of the base platform corresponding to a display area of the to-be-aligned display panel is transparent;

a display panel driving system connected to the to-be-aligned display panel; under the control of the display panel driving system, areas of the to-be-aligned display panel corresponding to the first group of pixels are in a light-transmissive state, and areas of the to-be-aligned display panel corresponding to the second group of pixels are in a light-shading state;

a first exposure light source located to be closer to the second substrate, light irradiating towards the first substrate from the second substrate is linearly polarized light; and a second exposure light source located to be closer to the first substrate, light emitted from the second exposure light source is linearly polarized light, the polarization direction of which is orthogonal to the transmission axis direction of the first polarizer.

2. The apparatus according to claim 1, wherein, when a second polarizer is provided on the second substrate, light emitted from the first exposure light source is natural light, which irradiates towards the first substrate through the second polarizer.

3. The apparatus according to claim 1, wherein,
when a second polarizer is provided on the second substrate, light emitted from the first exposure light source is linearly polarized light, the polarization direction of which is parallel to the transmission axis direction of the second polarizer; or
when there is no second polarizer provided on the second substrate, light emitted from the first exposure light source is linearly polarized light.

4. The apparatus according to claim 1, wherein,
a quartz plate is provided on the base platform, light emitted from the first exposure light source is natural light, which irradiates towards the first substrate through the quartz plate.

5. The apparatus according to claim 1, wherein, the apparatus further includes a first light source controlling system which is provided with an arc-shaped guide rail for controlling the first exposure light source to move along the arc-shaped guide rail so as to perform exposure on the to-be-aligned display panel.

6. The apparatus according to claim 5, wherein,
the center of the arc-shaped guide rail is located at a best viewing point at the light-outgoing side of the to-be-aligned display panel.

7. The apparatus according to claim 5, wherein,
the apparatus further includes a second light source controlling system for controlling the second exposure light source to move horizontally within the plane parallel to the to-be-aligned display panel so as to perform exposure on the to-be-aligned display panel.

8. A method for fabricating a retardation plate comprising; providing an apparatus for aligning a to-be-aligned display panel by self-alignment exposure, distributing a first group of pixels and a second group of pixels at intervals on the to-be-aligned display panel; the to-be-aligned display panel includes a first substrate and a second substrate, a first polarizer is provided on the first substrate, and a light alignment layer is provided on the first polarizer, the apparatus including:
a base platform, for placing the to-be-aligned display panel, an area of the base platform corresponding to a display area of the to-be-aligned display panel is transparent;
a display panel driving system connected to the to-be-aligned display panel; under the control of the display panel driving system, areas of the to-be-aligned display panel corresponding to the first group of pixels are in a light-transmissive state, and areas of the to-be-aligned display panel corresponding to the second group of pixels are in a light-shading state;
a first exposure light source located to be closer to the second substrate, light irradiating towards the first substrate from the second substrate is linearly polarized light; and
a second exposure light source located to be closer to the first substrate, light emitted from the second exposure light source is linearly polarized light, the polarization direction of which is orthogonal to the transmission axis direction of the first polarizer;
wherein the apparatus further includes a first light source controlling system which is provided with an arc-shaped guide rail for controlling the first exposure light source to move along the arc-shaped guide rail so as to perform exposure on the to-be-aligned display panel;
wherein the apparatus further includes a second light source controlling system for controlling the second exposure light source to move horizontally within the plane parallel to the to-be-aligned display panel so as to perform exposure on the to-be-aligned display panel;
wherein the method comprises:
placing the to-be-aligned display panel on the base platform, connecting the to-be-aligned display panel to the display panel driving system, and controlling areas of the to-be-aligned display panel corresponding to the first group of pixels to be in a light-transmissive state and controlling areas of the to-be-aligned display panel corresponding to the second group of pixels to be in a light-shading state;
turning on the first exposure light source so that light emitted from the first exposure light source transmits through the base platform and the first group of pixels to align optical alignment material on the optical alignment layer corresponding to the first group of pixels by exposure;
aligning all optical alignment material on the optical alignment layer corresponding to the first group of pixels by exposure of the first exposure light source under the control of the first light source controlling system;
turning off the first exposure light source, and turning on the second exposure light source to align optical alignment material on the light alignment layer corresponding to the second group of pixels by exposure;
aligning all optical alignment material on the optical alignment layer corresponding to the second group of pixels by exposure of the second exposure light source under the control of the second light source controlling system; and
after completing the process of alignment, injecting liquid crystal molecules, aligning the first substrate and the second substrate to be a cell, and performing a curing process on the liquid crystal cell.

9. The apparatus according to claim 2, wherein,
the apparatus further includes a first light source controlling system which is provided with an arc-shaped guide rail for controlling the first exposure light source to move along the arc-shaped guide rail so as to perform exposure on the to-be-aligned display panel.

10. The apparatus according to claim 3, wherein,
the apparatus further includes a first light source controlling system which is provided with an arc-shaped guide rail for controlling the first exposure light source to move along the arc-shaped guide rail so as to perform exposure on the to-be-aligned display panel.

11. The apparatus according to claim 4, wherein,
the apparatus further includes a first light source controlling system which is provided with an arc-shaped guide rail for controlling the first exposure light source to move along the arc-shaped guide rail so as to perform exposure on the to-be-aligned display panel.

12. The apparatus according to claim 9, wherein,
the center of the arc-shaped guide rail is located at a best viewing point at the light-outgoing side of the to-be-aligned display panel.

13. The apparatus according to claim 10, wherein,
the center of the arc-shaped guide rail is located at a best viewing point at the light-outgoing side of the to-be-aligned display panel.

14. The apparatus according to claim 11, wherein,
the center of the arc-shaped guide rail is located at a best viewing point at the light-outgoing side of the to-be-aligned display panel.

15. The apparatus according to claim 9, wherein,
the apparatus further includes a second light source controlling system for controlling the second exposure light source to move horizontally within the plane parallel to the to-be-aligned display panel so as to perform exposure on the to-be-aligned display panel.

16. The apparatus according to claim 10, wherein,
the apparatus further includes a second light source controlling system for controlling the second exposure light source to move horizontally within the plane parallel to the to-be-aligned display panel so as to perform exposure on the to-be-aligned display panel.

17. The apparatus according to claim 11, wherein,
the apparatus further includes a second light source controlling system for controlling the second exposure light source to move horizontally within the plane parallel to the to-be-aligned display panel so as to perform exposure on the to-be-aligned display panel.

18. A method for fabricating a retardation plate comprising; providing an apparatus for aligning a to-be-aligned display panel by self-alignment exposure, distributing a first group of pixels and a second group of pixels at intervals on the to-be-aligned display panel; the to-be-aligned display panel includes a first substrate and a second substrate, a first polarizer is provided on the first substrate, and a light alignment layer is provided on the first polarizer, the apparatus including:
  a base platform, for placing the to-be-aligned display panel, an area of the base platform corresponding to a display area of the to-be-aligned display panel is transparent;
  a display panel driving system connected to the to-be-aligned display panel; under the control of the display panel driving system, areas of the to-be-aligned display panel corresponding to the first group of pixels are in a light-transmissive state, and areas of the to-be-aligned display panel corresponding to the second group of pixels are in a light-shading state;
  a first exposure light source located to be closer to the second substrate, light irradiating towards the first substrate from the second substrate is linearly polarized light; and
  a second exposure light source located to be closer to the first substrate, light emitted from the second exposure light source is linearly polarized light, the polarization direction of which is orthogonal to the transmission axis direction of the first polarizer;
  wherein a second polarizer is provided on the second substrate, light emitted from the first exposure light source is natural light, which irradiates towards the first substrate through the second polarizer;
  wherein the apparatus further includes a first light source controlling system which is provided with an arc-shaped guide rail for controlling the first exposure light source to move along the arc-shaped guide rail so as to perform exposure on the to-be-aligned display panel;
  wherein the apparatus further includes a second light source controlling system for controlling the second exposure light source to move horizontally within the plane parallel to the to-be-aligned display panel so as to perform exposure on the to-be-aligned display panel;
  wherein the method comprises:
  placing the to-be-aligned display panel on the base platform, connecting the to-be-aligned display panel to the display panel driving system, and controlling areas of the to-be-aligned display panel corresponding to the first group of pixels to be in a light-transmissive state and controlling areas of the to-be-aligned display panel corresponding to the second group of pixels to be in a light-shading state;
  turning on the first exposure light source so that light emitted from the first exposure light source transmits through the base platform and the first group of pixels to align optical alignment material on the optical alignment layer corresponding to the first group of pixels by exposure;
  aligning all optical alignment material on the optical alignment layer corresponding to the first group of pixels by exposure of the first exposure light source under the control of the first light source controlling system;
  turning off the first exposure light source, and turning on the second exposure light source to align optical alignment material on the light alignment layer corresponding to the second group of pixels by exposure;
  aligning all optical alignment material on the optical alignment layer corresponding to the second group of pixels by exposure of the second exposure light source under the control of the second light source controlling system; and
  after completing the process of alignment, injecting liquid crystal molecules, aligning the first substrate and the second substrate to be a cell, and performing a curing process on the liquid crystal cell.

* * * * *